US008906572B2

(12) United States Patent
Krishnan et al.

(10) Patent No.: US 8,906,572 B2
(45) Date of Patent: Dec. 9, 2014

(54) POLYMER-ELECTROLYTE MEMBRANE, ELECTROCHEMICAL FUEL CELL, AND RELATED METHOD

(71) Applicant: General Electric Company, Schenectady, NY (US)

(72) Inventors: Lakshmi Krishnan, Clifton Park, NY (US); Gary William Yeager, Rexford, NY (US); Grigorii Lev Soloveichik, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/690,721

(22) Filed: Nov. 30, 2012

(65) Prior Publication Data

US 2014/0154612 A1    Jun. 5, 2014

(51) Int. Cl.
*H01M 8/14*    (2006.01)
*H01M 8/10*    (2006.01)

(52) U.S. Cl.
CPC .......... *H01M 8/1023* (2013.01); *H01M 8/1039* (2013.01); *H01M 8/1051* (2013.01); *H01M 8/1086* (2013.01); *H01M 2008/1095* (2013.01); *Y02E 60/521* (2013.01)
USPC ........... 429/477; 429/483; 429/491; 429/492; 429/493; 429/494

(58) Field of Classification Search
CPC . Y02E 60/526; Y02E 60/521; H01M 8/1039; H01M 8/1004
USPC .................. 429/477, 483, 491, 492, 493, 494
See application file for complete search history.

(56) References Cited

U.S. PATENT DOCUMENTS

| | | | |
|---|---|---|---|
| 6,277,512 B1 | 8/2001 | Hamrock et al. | |
| 6,306,536 B1 | 10/2001 | Wilkinson et al. | |
| 6,492,431 B1 | 12/2002 | Cisar | |
| 6,495,209 B1 | 12/2002 | Cisar | |
| 6,610,432 B1 * | 8/2003 | Wilkinson et al. | 429/532 |
| 6,682,839 B2 | 1/2004 | Wilkinson et al. | |
| 6,713,206 B2 | 3/2004 | Markoski et al. | |
| 6,824,914 B2 | 11/2004 | Iyer | |
| 6,841,285 B2 | 1/2005 | Wilkinson et al. | |
| 7,252,898 B2 | 8/2007 | Markoski et al. | |
| 7,271,229 B2 | 9/2007 | Okazoe et al. | |

(Continued)

FOREIGN PATENT DOCUMENTS

WO    2008015478 A1    2/2008

OTHER PUBLICATIONS

Hickner et al., "Alternative Polymer Systems for Proton Exchange Membranes", Chemical Reviews, 2004, vol. 104, Issue 10, pp. 4587-4612.

(Continued)

*Primary Examiner* — Patrick Ryan
*Assistant Examiner* — Ben Lewis
(74) *Attorney, Agent, or Firm* — Francis T. Coppa

(57) ABSTRACT

A polymer-electrolyte membrane is presented. The polymer-electrolyte membrane comprises an acid-functional polymer, and an additive incorporated in at least a portion of the membrane. The additive comprises a fluorinated cycloaliphatic additive, a hydrophobic cycloaliphatic additive, or combinations thereof, wherein the additive has a boiling point greater than about 120° C. An electrochemical fuel cell including the polymer-electrolyte membrane, and a related method, are also presented.

10 Claims, 4 Drawing Sheets

(56) References Cited

U.S. PATENT DOCUMENTS

| | | |
|---|---|---|
| 7,517,604 B2 | 4/2009 | Hamrock et al. |
| 7,651,797 B2 | 1/2010 | Markoski et al. |
| 7,709,665 B2 | 5/2010 | Okazoe et al. |
| 7,879,476 B2 | 2/2011 | Sugiyama et al. |
| 8,198,394 B2 | 6/2012 | Tayanagi et al. |
| 8,252,481 B2 | 8/2012 | Ito |
| 8,278,004 B2 | 10/2012 | Adachi et al. |
| 2003/0059655 A1 | 3/2003 | Iyer |
| 2003/0134163 A1 | 7/2003 | Markoski et al. |
| 2003/0175431 A1 | 9/2003 | Cisar |
| 2005/0069745 A1 | 3/2005 | Vijayendran et al. |
| 2007/0087244 A1 | 4/2007 | Melzner et al. |
| 2008/0199753 A1 | 8/2008 | Fuller et al. |
| 2008/0292931 A1 | 11/2008 | Schwartz et al. |
| 2009/0092893 A1* | 4/2009 | Takita et al. ............ 429/145 |
| 2010/0062306 A1* | 3/2010 | Oota et al. ............ 429/30 |
| 2011/0303868 A1 | 12/2011 | Sienkiewicz et al. |

OTHER PUBLICATIONS

Benoit Lafitte., "Proton-Conducting Sulfonated and Phosphonated Polymers and Fuel Cell Membranes by Chemical Modification of Polysulfones", Lund University, Feb. 26, 2007, 75 Pages.

Potyrailo et al., "Combinatorial Screening of Polymeric Sensing Materials Using RFID Sensors: Combined Effects of Plasticizers and Temperature", Journal of Combinatorial Chemistry, 2009, vol. 11, Issue 4, pp. 598-603.

* cited by examiner

POLYMER-ELECTROLYTE MEMBRANE, ELECTROCHEMICAL FUEL CELL, AND RELATED METHOD

STATEMENT REGARDING FEDERALLY SPONSORED RESEARCH & DEVELOPMENT

This invention was made with Government support under contract number DE-SC0001055, awarded by the U.S. Department of Energy. The Government has certain rights in the invention.

BACKGROUND OF THE INVENTION

The invention relates generally to polymer-electrolyte membranes. Particularly, the invention relates to polymer-electrolyte membranes suitable for use in electrochemical fuel cells.

Electrochemical fuel cells convert reactants, namely fuel and oxidant streams, to generate electric power and reaction products. Fuel cells typically oxidize fuels to produce electrons and protons, at a catalyst layer disposed on an electrically-conductive material, serving as the anode. The electrons are conducted through the anode, and produce electrical energy. The protons flow from the anode through an electrolytic medium, often supported by a membrane, to a catalyst layer disposed on the cathode, where they are recombined with electrons to reduce an oxidant. In the case of hydrogen fuel cells, molecular hydrogen is oxidized into electrons and protons at the anode. The electrons so produced are transported through the electrically conductive anode, whereas the protons migrate through a polymer-electrolyte membrane (PEM). The PEM comprises a polymeric scaffold supporting a proton-conductive electrolyte (often aqueous) phase that enables conduction of protons (as electrolyte-bound cations) through the PEM, to the cathode where they recombine with electrons to reduce an oxidant, generally oxygen.

To produce a structure capable of performing the above mentioned electrochemical task, an anode and cathode, each containing catalyst particles, are adhered to opposite sides of the PEM to form a layered composite structure. This composite structure is responsible for the electrochemical conversions and directed flow of fuel, byproducts, ions, electrolytes and electrons requisite for the electrochemical functioning of a fuel cell. This layered composite structure is also referred to as a membrane electrode assembly (MEA).

PEMs may generally exhibit phase separated morphologies, wherein an electrolyte phase is dispersed within a continuous polymeric phase that provides mechanical stability. Both electrolyte and polymer phases can impact the permeation of protons through the PEM. On a molecular level, the chemical characteristics of the electrolyte desirable for proton conduction include molecular topology, mobility, and acidity. Increased electrolyte concentration within the membrane may enhance accessibility and improve rates of proton sorption and permeation though the membrane. Maintenance of constant electrolyte concentration may be desirable for obtaining stable proton conductivity, and replenishment of vaporized or leached electrolyte may be continuously performed during operation. On a morphological level, dynamic fluctuations between electrolyte domains may provide conductive pathways through the polymeric continuous phase. Thus, the ability of the polymeric phase to mechanically comply with the anodic proton flux may enable proton percolation though the membrane and enhance conductivity.

It is also desirable that the membrane be mechanically robust during operation, and serve as a dielectric and mechanical barrier to the electrical and electrochemical processes within the MEA, while simultaneously conducting protons. Thus typical polymers for PEMs possess oligomeric regions that are non-interactive with the electrolyte, but rather, are involved in intermolecular associations to provide a mechanically robust, continuous phase. In addition, these polymers have regions compatible with the chosen electrolyte; and these regions generally contain acidic or basic residues. PEMs of particular interest comprise acid-functional polymers such as acid-functional fluoropolymers, and electrolytes, such as, water. Suitable examples of acid-functional fluoropolymers include electrolyte non-interactive (or hydrophobic) oligo(perfluoroethylene) blocks; and electrolyte interactive fluorosulfonic acid residues pendant to the polymer chain.

The ability of the PEM to separate electrochemical processes by selectively restricting permeation of fuel, oxidant and byproducts is also desirable. This process is often referred to as "crossover". Thus, in order to improve efficiencies, it may be desirable to have a PEM with low fuel crossover.

When water is used as an electrolyte, the conductivity of the PEM may suffer at temperatures greater than 80° C. This is a result of evaporative depletion of the electrolyte phase in the PEM. Humidification of the membrane thus improves performance of the fuel cell over extended periods. However, the cell performance may further degrade at higher temperatures, particularly over 100° C., where there is reduced water absorption. As the vapor pressure of water increases rapidly with temperature, it becomes necessary to operate the fuel cell at higher pressures, which increases system design complexity and cost. Thus, there is a need to operate under low relative humidity conditions, even at normal operating temperatures.

Accordingly, there is a need for PEM configurations that improve electrochemical performance when operated under low humidity and/or high temperature conditions. Further, it may be desirable to have such PEM configurations suitable for use within the fuel cell environment.

BRIEF DESCRIPTION OF THE INVENTION

One embodiment is directed to a polymer-electrolyte membrane. The polymer-electrolyte membrane comprises an acid-functional polymer, and an additive incorporated in at least a portion of the membrane. The additive comprises a fluorinated cycloaliphatic additive, a hydrophobic cycloaliphatic additive, or combinations thereof, wherein the additive has a boiling point greater than about 120° C.

Another embodiment is directed to a polymer-electrolyte membrane. The polymer-electrolyte membrane comprises an acid-functional polymer, and a fluorinated cycloaliphatic additive incorporated in at least a portion of the membrane. The fluorinated cycloaliphatic additive has a boiling point greater than about 120° C.

Another embodiment is directed to an electrochemical fuel cell. The electrochemical fuel cell comprises a first electrode, a second electrode, and a polymer-electrolyte membrane disposed between the first electrode and the second electrode. The polymer-electrolyte membrane comprises an acid-functional polymer, and an additive is incorporated in at least a portion of the membrane. The additive comprises a fluorinated cycloaliphatic additive, a hydrophobic cycloaliphatic additive, or combinations thereof, wherein the additive has a boiling point greater than about 120° C.

Another embodiment is directed to a method of making an electrochemical fuel cell. The method comprises:

(i) incorporating an additive into at least a portion of the polymer-electrolyte membrane to form an additive-modified polymer-electrolyte membrane, wherein the polymer-electrolyte membrane comprises an acid-functional polymer, and the additive comprises a fluorinated cycloaliphatic additive, a hydrophobic cycloaliphatic additive, or combinations thereof, and wherein the additive has a boiling point greater than about 120° C.; and (ii) assembling a first electrode, the additive-modified polymer-electrolyte membrane, and a second electrode into the electrochemical fuel cell.

DRAWINGS

These and other features, aspects, and advantages of the present invention will become better understood when the following detailed description is read with reference to the accompanying drawings, in which like characters represent like parts throughout the drawings, wherein.

DETAILED DESCRIPTION

Figure 1:
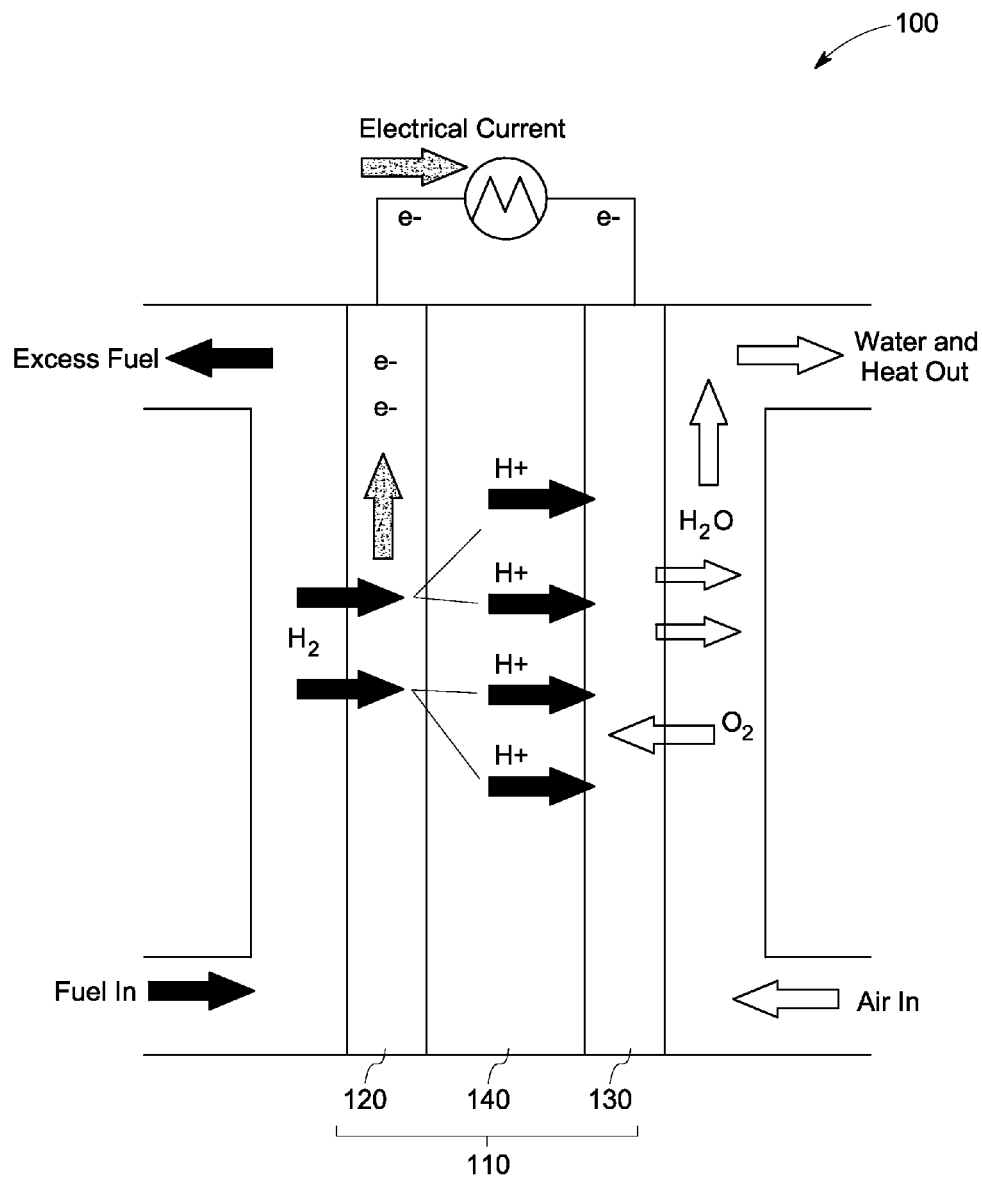
FIG. 1 illustrates an electrochemical fuel cell, according to some embodiments of the invention.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill, having the benefit of this disclosure.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

As discussed in detail below, some embodiments of the invention are directed to a polymer-electrolyte membrane. The polymer-electrolyte membrane includes an acid-functional polymer. The term "polymer-electrolyte membrane" as used herein refers to a semipermeable membrane configured to transport protons, while separating the reactants, such as, for example, oxygen and hydrogen. The terms "polymer-electrolyte membrane" and "proton-exchange membrane" are sometimes used interchangeably in the art. Further, the polymer-electrolyte membrane may be substantially polymeric in nature, or, alternatively, may include a composite membrane.

As noted earlier, the polymer-electrolyte membrane includes an acid-functional polymer. The term "acid-functional polymer" refers to a polymer including a plurality of "acid-functional groups". The term "acid-functional group" is defined as an acid group or a group readily converted to an acid group (for example, an alkaline salt (through acidification), or an ester (through hydrolysis)). Suitable non-limiting examples of acid-functional groups include one or more of sulfonic acid, sulfonyl halide, dialkylphosphonate, phosphonic acid, carboxylic acid, carbonyl halide, sulfonylimide, or the alkaline salt or ester forms of the foregoing.

The sulfonyl halides may include, but are not limited to, sulfonyl chloride or sulfonyl fluoride. The perfluorinated sulfonyl halides may include, but are not limited to, perfluorinated sulfonyl chloride or perfluorinated sulfonyl fluoride. The partially fluorinated sulfonyl halides may include, but are not limited to, partially fluorinated sulfonyl chloride or partially fluorinated sulfonyl fluoride. The carbonyl halides may include, but are not limited to, carbonyl chloride, carbonyl fluoride or carbonyl iodide. The dialkylphosphonate may include, but are not limited to, diethylphosphonate or dimethylphosphonate.

As will be appreciated by one of ordinary skill in the art, two or more of the aforementioned functional groups may be further present in the polymer, in alternating, random, or block arrangement. The polymer may be linear or branched. Further, in some embodiments, the polymer-electrolyte membrane may include a blend of a two or more of the acid-functional polymers.

In certain embodiments, the acid-functional polymer may include a sulfonated polymer. A sulfonated polymer refers to a polymer including a plurality of sulfonic acid functional groups. Some specific examples of the sulfonated polymers include, but are not limited to, sulfonated polyether ether ketone (PEEK); sulfonated poly(phenylene ether ether ketone); sulfonated polystyrene; sulfonated polyethylene, sulfonated polyethylene oxide; sulfonated polypropylene oxide; sulfonated polytetramethylene oxide; sulfonated polyetherimide, and various combinations of any of the foregoing. In certain embodiments, the acid-functional polymer includes an acid-functional fluoropolymer, such as a sulfonic acid-functional fluoropolymer.

Numerous examples of acid-functional fluoropolymers are described in the literature and include polymers prepared by a polymerization process, such as radical polymerization. The acid-functional fluoropolymers may also be prepared by copolymerization of monomers selected from the group consisting of an acid-functional fluoromonomer(s), a non-acid-functional fluoromonomer(s), and an acid salt functional-fluoromonomer(s). As will be appreciated by one of ordinary skill in the art, an acid-functional fluoromonomer refers to a monomer including at least one acid-functional group. A non-acid functional fluoromonomer refers to a monomer including at least one non-acid functional group. An acid-salt-functional fluoromonomer refers to a monomer including at least one acid-salt functional group Acid-functional fluoromonomers useful in the preparation of acid-functional fluoropolymers, and processes for their conversion into acid functional fluoropolymers and membranes, are described in Patent Pub. Nos. CN102024958A, CN102008905A, CN101794888A, CN101777657A, CN01768235A, CN101764232A, CN101733014A, WO2010074432A1, CN101350413A, CN102042446A, WO2008001894A1, WO2008066186A1, JP2005002188A, WO2003106515A1, US20020160272A1, U.S. Pat. No. 6,440,594B1. WO2001007517A1, WO2000038261A1, EP1267434A2 EP409344A2, JP600031554A, WO02011013578A1, and WO2004097851A1, all of which are incorporated herein by reference in their entirety, to the extent their teachings are not directly contradictory to the teachings described herein.

Acid-salt-functional fluoromonomers may include metal salts of compounds described in the incorporated references, listed above. Thus, by way of example, the acid group of the acid-functional fluoromonomers may be deprotonated, and the resulting anionic fluoromonomers may be coordinated with positively charged metals. A suitable metal may be selected from the group consisting of Ce, Mn, La, Zn, W, Ti, V, Fe, Co, Ni, Cu, and combinations thereof. The number of ionized anionic fluoromonomers coordinated to the metal may range from 1 to 4, or from 2 to 4, and may depend on the oxidation state of the metal. In instances where the number of coordinating fluoromonomers is 2 or greater, they may be the same or different.

Non-acid-functional fluoromonomers are described in the incorporated references, and include fluorinated vinyl monomers devoid of acid functionality. Non-limiting examples include fluorinated alkenes, such as, 1,1,2,2-tetrafluoroethene 1-chloro-1,2,2-trifluoroethene, 1,1-difluoroethene, 1,1,2,3,3,3-hexafluoro-1-propene, 1,1,3,3,3-pentafluoro-2-(trifluoromethyl)-1-propene); fluorinated vinylethers, such as, trifluoro(trifluoromethoxy)ethene, 1,1,2-trifluoro-2-(1,1,2,2,2-pentafluoroethoxy)ethane, 1,1,2,2,3,3-hexafluoro-1-[(1,2,2-trifluoroethenyl)oxy]-3-(trifluoromethoxy)propane, 1,1,1,2,2,3,3-heptafluoro-3-[(1,2,2-trifluoroethenyl)oxy]propane, 2,2-bis(trifluoromethyl)-1,3-dioxole, 4,5-difluoro-2,2-bis(trifluoromethyl)-1,3-dioxole, 1,1,2,3,3,4,4-heptafluoro-4-[(1,2,2-trifluoroethenyl)oxy]-1-butene, 1,2,3,3,4,4,4-heptafluoro-1-[(trifluoroethenyl)oxy]-1-butene and 1-[(2,2-difluoroethenyl)oxy]-1,1,2,2,3,3,4,4,4-nonafluorobutane); fluorinated vinyl nitrile monomers, such as, 2,3,3-trifluoro-2-propenenitrile, 2,2-difluoro-2-[(1,2,2-trifluoroethenyl)oxy]acetonitrile, 2,2,3,3-tetrafluoro-3-[1,2,2-trifluoro-1-methyl-2-[(1,2,2-trifluoroethenyl)oxy]ethoxy]-propanenitrile, 2,3,3,3-tetrafluoro-2-[1,1,2,2,3,3-hexafluoro-3-[(1,2,2-trifluoroethenyl)oxy]propoxy]-propanenitrile, and 2,2,3,3,4,4,5,5,6,6-decafluoro-6-[(1,2,2-trifluoroethenyl)oxy]hexanenitrile).

In certain instances, a suitable acid-functional polymer may be one that is thermally stable at temperatures greater than about 80° C. In some embodiments, the suitable polymer is thermally stable at a temperature of at least about 100° C., and in some further embodiments, at a temperature of at least about 200° C.

A variety of acid-functional polymers may be used for this purpose, and many are available in the art. Those skilled in this area understand that many polymers can be made to be acid-functional, for example, by modifying an unmodified polymer with an acid functional group. The modification may be accomplished on a polymer which is in the form of a neat unmodified polymer powder, a solution of the unmodified polymer, or an unmodified polymer which has been formed into a dense or porous polymer membrane. Examples of such processes include those described in U.S. Pat. No. 7,993,793, U.S. Pat. No. 6,319,019 U.S. Pat. No. 7,563,532, incorporated herein by reference.

Non-limiting examples of commercially available acid-functional polymers include Nafion®, Flemion®, and Aquivion®. Other acid-functional polymers are described in U.S. Pat. Nos. 7,547,756, 7,595,373, 8,158,301, and 7393914; and U.S. Patent Pub. Nos. 2007/0142614, 2008/0004443, 2008/0114183, 2008/0261098, incorporated herein by reference so long as directly contradictory the teachings described herein.

As noted earlier, an additive is further incorporated in at least a portion of the membrane. The additive includes a fluorinated cycloaliphatic additive, a hydrophobic cycloaliphatic additive, or combinations thereof. As used herein, the term "cycloaliphatic additive" refers to a compound including at least one cycloaliphatic moiety.

The term "cyclolaliphatic moiety" refers to a moiety having a valence of at least one, and including an array of hydrogen and carbon atoms (sometimes referred to in the art as cyclohydrocarbyl moiety), which is cyclic but which is not aromatic. The cycloaliphatic moiety may be further monocyclic, bicyclic or polycyclic. Bicyclic and polycyclic moieties may be fused (for example, in decalin and tetradecahydroanthracene) or linked (for example, in bicyclohexane). In certain instances, the cycloaliphatic moiety may include four, five, six, seven, or eight-member rings.

A "cycloaliphatic moiety" may further include one or more functional groups. Suitable functional groups may include linear or aromatic functional groups. For example, a cyclohexylmethylene group ($C_6H_{11}CH_2$—) is a cycloaliphatic moiety which includes a cyclohexyl ring (the array of atoms which is cyclic but which is not aromatic) and a methylene group (the linear component). For convenience, the term "cycloaliphatic moiety" is defined herein to encompass a wide range of functional groups such as alkyl groups, alkenyl groups, phenyl groups, benzyl groups, alkynyl groups, haloalkyl groups, ether groups conjugated dienyl groups, hydroxyl groups, amine groups, nitro groups, and the like. For example, the 4-methyl cyclopenten-1-yl moiety is a $C_6$ cycloaliphatic moiety including a methyl group, the methyl group being a functional group which is an alkyl group. The term "a $C_7$ cycloaliphatic moiety" includes cycloaliphatic moieties containing at least 7 carbon atoms. For example, the cyclohexylmethylene moiety ($C_6H_{11}CH_2$—) represents a $C_7$ cycloaliphatic moiety.

The cycloaliphatic moiety may be further characterized by the number of carbon atoms. A suitable cyclolaliphatic additive in accordance with some embodiments of the invention has greater than 7 carbons. In some embodiments, the total number of carbon atoms in the cycloaliphatic moiety (including both the cyclic component and any functional groups (if present)) is greater than 7. In some embodiments, the number of carbon atoms present in the cyclic component of the cycloaliphatic moiety is greater than 7.

The term "fluorinated cycloaliphatic additive" refers to a cycloaliphatic compound in which at least one hydrogen atom in the corresponding cycloaliphatic hydrocarbon is substituted with fluorine. In certain embodiments, a plurality of hydrogen atoms, in the corresponding cycloaliphatic hydrocarbon, are substituted with fluorine atoms. In certain embodiments, greater than about 50% of the hydrogen atoms, in the corresponding cycloaliphatic hydrocarbon, are substituted with fluorine. In certain embodiments, greater than about 70% of the hydrogen atoms in the corresponding cycloaliphatic hydrocarbon are substituted with fluorine. In certain embodiments, the percentage of hydrogen atoms substituted with fluorine is in a range from about 50% to about 100%. In certain embodiments, all of the hydrogen atoms are substituted with fluorine, and such compounds are referred to as perfluorinated compounds.

As noted, the cycloaliphatic moiety may be polycyclic in some embodiments. In certain embodiments, the fluorinated cycloaliphatic additive includes monocyclic or bicyclic fluorinated cycloaliphatic compounds. Fluorinated cycloaliphatic compounds useful as additives in the present invention, and methods for their synthesis are described in Patent Pub. Nos. U.S. Pat. No. 6,239,313, U.S. Pat. No. 5,482,682, U.S. Pat. No. 4,868,318 U.S. Pat. No. 6,127,430, and CA1129411A, incorporated herein by reference.

Suitable non-limiting examples of fluorinated cycloaliphatic additives include perfluoro(1,3,5-trimethylcyclohexane), cis-perfluorodecalin, trans-perfluorodecalin, perfluorodecalin, perfluoro(1-methyldecalin), perfluoro(2-methyldecalin), perfluoro(isopentyl-tetrahydropyran), perfluorobicyclohexane, perfluorohydrophenanthrene, perfluorotetradecahydroanthracene, perfluoro(2-(cyclohexylmethyl)decalin, perfluoro(N-methyldecahydroisoquinoline) perfluoro-(1,2-ethanediylbis(morpholine)), perfluoro(N-cyclohexylmorpholine), perfluoro(dimethyl-adamantane), perfluorotri-methylbicyclo(3.3.1)nonane, perfluoro(1-methyldecalin), perfluoro(isopropylcyclohexane), perfluoro(n-propylcyclohexane), perfluoro(1,4-diethylcyclohexane) perfluoro(1,3-diethylcyclohexane, perfluoro(1,2-diethylcyclohexane), perfluoro(1H-fluorene), perfluorobutylcyclohexane, perfluorophenanthrene, perfluorobicyclohexyl, or combinations thereof. As noted earlier, the fluorinated cycloaliphatic moiety may further include one or more linear or aromatic functional groups.

The term "hydrophobic cycloaliphatic additive" as used herein refers to a compound that is substantially free of hydrophilic functional groups. "Substantially free" as used herein mean that less than about 10 weight percent of hydrophilic groups are present in the hydrophobic cycloaliphatic additive. In some embodiments, the hydrophobic cycloaliphatic additive includes less than about 5 weight percent of hydrophilic groups. In some embodiments, the hydrophobic cycloaliphatic additive includes less than about 1 weight percent of hydrophilic groups. The term "hydrophilic functional group" refers to a functional group selected from the group consisting of amine, hydroxyl, carbonyl, carboxyl, imide, and combinations thereof.

Suitable non-limiting examples of a cycloaliphatic moiety include cis-decalin, trans-decalin, octahydro-1H-indene, tetrahydrodicyclopentadiene, 1,4,5,8-dimethanodecalin, tetradecahydroanthracene, dodecahydro-1H-phenanthrene, and combinations thereof. As noted earlier, the cycloaliphatic moiety may further include one or more linear or aromatic functional groups. Accordingly, in some embodiments, the additive may include a derivative of one or more of the aforementioned cycloaliphatic moieties, for example, benzyldecalin. In certain embodiments, the hydrophobic cycloaliphatic additive includes monocyclic or bicyclic cycloaliphatic compounds.

In certain embodiments, the additive includes a fluorinated cycloaliphatic additive. Without being bound by any theory, it is believed that the presence of the fluorinated hydrocarbon additives, due in part to their higher oxidative stability, may result in increased oxidative resistance of the polymer-electrolyte membranes. Furthermore, the similarity of the electronic structure of fluorinated additives with the continuous phase of fluoropolymers used in polymer electrolyte membranes may render the fluorinated additives more miscible and compatible with the polymer continuous phase.

A single type of additive may be incorporated in the membrane, or alternatively, a blend of two or more of the aforementioned additives may be incorporated in the membrane. In some embodiments, it is also envisioned that the membrane may include a blend of one or more of the aforementioned hydrophobic additives along with one or more supplemental additives. Suitable non-limiting examples of the supplemental additives that may be used include perfluorosulfonic acids, perfluorosulfonylimides, perfluorophosphonic acids, or combinations thereof.

Without being bound by any theory, it is believed that use of the cycloaliphatic additives in accordance with embodiments of the invention may result in reduced leaching of the additive from the membrane, when compared to the hydrophilic linear additives (e.g., linear alkanes or amines). The cycloaliphatic additives, at least in part, due to the increased steric size and lower water solubility, are expected to have reduced mobility in the membrane environment, resulting in reduced leaching. As will be appreciated by one of ordinary skill in the art, leaching of the additives out of the membrane during prolonged use of the fuel cell may result in performance degradation over time. Thus the cycloaliphatic additives may be beneficial for long-term use of the fuel cell.

In addition to the desirable attributes of steric size, as mentioned above, a suitable additive may have a boiling greater than about 120° C. As noted earlier, for certain end-use applications, it may be desirable to operate the fuel cell at temperatures greater than 100° C. As will be appreciated by one of ordinary skill in the art, selection of the additives having boiling points greater than about 120° C. may allow for prolonged operation of the fuel cell at high temperatures, such that the additive leaching is mitigated.

As mentioned, the additive is incorporated in at least a portion of the membrane. The term "incorporated" as used herein is meant to encompass both physical and chemical incorporation of the additive in the membrane. In certain embodiments, a physical incorporation of the additive into at least a portion of membrane pores is envisaged. In such instances, the incorporated additive may be further capable of interacting with at least a portion of the acid-functional polymer by physical bond formation, such as, for example, by van der Waals interaction. Further, the term incorporated, in such instances, is meant to encompass both partial and complete filling of the membrane pores.

The amount of the additive incorporated in the membrane may depend, in part, on one or more of the additive attributes (e.g., additive type, size, polymer compatibility); the membrane attributes (e.g., polymer composition, pore size); and the process parameters used for the incorporation step (e.g., temperature, concentration). In general, the additive may be present in the membrane in an amount greater than about 0.5 weight percent of the total weight of the membrane. In some embodiments, the additive is present in the membrane in an amount in a range from about 0.5 weight percent to about 10 weight percent of the total weight of the membrane. In some embodiments, the additive is present in the membrane in an amount in a range from about 1 weight percent to about 5 weight percent of the total weight of the membrane.

In certain embodiments, the polymer-electrolyte membrane may be used in a fuel cell as a solid electrolyte. In some embodiments, a membrane electrode assembly (MEA) may be comprised of the polymer-electrolyte membrane. The term "membrane electrode assembly" as used herein may refer to a stack of the polymer-electrolyte membranes and at least one electrode. Referring now to FIG. 1, a MEA 110, in accordance with some embodiments of the invention, may include a first electrode 120, a second electrode 130, and a polymer-electrolyte membrane 140 disposed between the two electrodes 120,130.

In some instances, the polymer-electrolyte membrane may further include an additional electrolyte incorporated into at least a portion of the membrane. Without being bound by any theory, it is believed that the electrolyte (e.g., water) may facilitate hydration of the membrane, and further facilitate transport of the protons across the membrane.

A suitable electrolyte may include, for example, water, an oxo-acid, a nitrogen heterocyclic base, or combinations thereof. Suitable, non-limiting examples of an oxo-acid include phosphoric acid; a phosphonic acid (e.g., a perfluoroalkylphosphonic acid or a polyvinylphosphonate); sulfuric acid; a sulfonic acid (e.g., a perfluoroalkylsulfonic acid or a perfluorosulfonylimide); their substituted derivatives (including e.g., alkyl, perfluoroalkyl, hydroxyl, or amino groups); and combinations thereof. Suitable non-limiting examples of a nitrogen heterocyclic base include imidazole; triazole; pyrazole; tetrazole; their substituted derivatives (including e.g., alkyl, perfluoroalkyl, hydroxyl, or amino groups); and combinations thereof.

Some embodiments are further directed to an electrochemical fuel cell. Referring again to FIG. 1, an electrochemical fuel cell 100 includes a first electrode 120, a second electrode 130, and a polymer-electrolyte membrane 140 disposed between the first electrode 120 and the second electrode 130. As described in detail earlier, the polymer-electrolyte membrane includes an acid-functional polymer; and an additive incorporated in at least a portion the membrane, wherein the additive is described in detail earlier.

In some embodiments, the electrochemical fuel cell 100 includes a polymer-electrolyte membrane (PEM) fuel cell that includes a solid electrolyte (or the polymer-electrolyte membrane) 140 that separates an anode 120 and a cathode 130. The PEM fuel cell 110 may further include a suitable catalyst, typically disposed on the anodic side of the solid electrolyte 140, for accelerating the catalytic dissociation reaction, and oxidation of the fuel. In some embodiments, the PEM fuel cell 110 may further include a suitable catalyst on the cathodic side of the solid electrolyte 140 to increase the electrochemical cell potential and improve the oxygen reduction reaction.

A method of making an electrochemical fuel cell is also presented. The method includes incorporating an additive into at least a portion of the polymer-electrolyte membrane, as described earlier to form an additive-modified polymer-electrolyte membrane. The method may further include the step of contacting at least a portion of the polymer-electrolyte membrane with an additive or a solution including the additive. In certain embodiments, the polymer-electrolyte membrane may be prepared by immersing a pre-fabricated polymer-electrolyte membrane in a solution including the additive. The pre-fabricated polymer-electrolyte membrane may be chosen from commercial fluorinated acid-functional membranes described earlier.

In alternate embodiments, the polymer-electrolyte membrane may be fabricated by casting from a composition including the polymer electrolyte. The polymer electrolyte composition may include a solution, a dispersion, an emulsion, a polymer melt, a particles blend, a neat liquid blend, or combinations thereof. Depending on the form and specific composition of the polymer electrolyte composition, various membrane formation methods known to an ordinary skill may be employed. Non-limiting exemplary membrane formation methods may include extrusion through a slot die, solution casting, fixed gap coating, spray casting, dip coating, drawdown rod coating, calendaring, impregnation of a reinforcing sheet material, or combinations thereof.

The casting may be performed in the presence of an additive or blends thereof, such that, the additive is incorporated in at least a portion of the membrane, in some embodiments. As will be appreciated by one of ordinary skill in the art, conventional methods of casting membranes using solvents, typically involve a drying step to remove the solvent. In such instances, the polymer membrane may be subjected to a partial drying step in which a lower boiling solvent or mixture of solvents are removed and a higher boiling additive of the present invention is at least partially retained within the polymer membrane. The formulation of the casting solution and conditions of casting and drying may be optimized so as to incorporate the desired level of the additive into the membrane.

Alternatively, as described below, the membrane or polymer-electrolyte membrane, produced by any of the methods described above, may be immersed in a liquefied additive of the present invention, thus imbibing the membrane or polymer electrolyte membrane with the additive. The liquefied additive may naturally exist as a liquid at the temperatures used in the immersion step, or may be converted to a liquid at these temperatures by addition of co-solvent(s). In either case, the removal of the excess additive at the surface or the co-solvent may be performed by mechanically or by partial drying of the membrane. After formation of the additive-modified membrane it is possible to further incorporate an electrolyte or mixture of electrolytes to produce an additive-modified polymer-electrolyte membrane. This processes for electrolyte incorporation, including immersion, may be performed by methods used to produced fluoropolymer-electrolyte membranes, and are well-known to one skilled in the art.

The method furthermore includes assembling a first electrode 120, the additive-modified polymer-electrolyte membrane 140, and a second electrode 130 into an electrochemical fuel cell 100, as indicated in FIG. 1. PEM fuel cells of the type described above are well-known in the art, as are techniques for assembling all of the components for the fuel cell. Non-limiting examples of instructive references include U.S. Pat. Pub. Nos. 201010055513, 2008/0248339, 2007/0128485, and 2005/0136312, all of which are incorporated herein by reference, as long as they are not directly contradictory to the teachings herein. The PEM fuel cells, in accordance with the embodiments of invention, may be suited for use in home applications, as well as in automotive applications. As those skilled in the art understand, the fuel cells may be typically assembled into fuel cell stacks for greater practical utilization.

As described above, the attributes of the polymer-electrolyte membrane separating the cathode and the anode may be important to the operation of a fuel cell. The modified polymer-electrolyte membranes, in accordance with certain embodiments of the invention, exhibited unexpected positive performance attributes in a fuel cell at low relative humidity. Without being bound by any theory, it is believed that the use of the cycloaliphatic additives may result in increased H+ conductivity, lower $H_2$ crossover, and lower internal resistance. This may result in improved voltage and power output in a fuel cell.

Further, the use of the modified polymer-electrolyte membrane may reduce the need for humidification, and may also enable operation at temperatures greater than 100° C. This could lead to additional benefits of faster electrode kinetics, improved impurity tolerance, higher power densities, higher system efficiency, and better heat/water management. Moreover, the fuel cell systems based on the modified membranes may result in a simpler design, smaller stack size, and reduce or eliminate the need for a humidification system. The modified membranes may thus also allow the use of fuel cells in applications that require higher power density and efficiency.

EXAMPLES

The examples presented below are intended to be merely illustrative, and should not be construed to be any sort of limitation on the scope of the claimed invention. Unless specified otherwise, all of the components are commercially available from common chemical suppliers.

Example 1

Method of Fabricating Polymer-Electrolyte Membranes

The polymer-electrolyte membranes (Nafion® 212 from Dupont) were immersed in organic liquid compounds (listed in Table 1) for 24 hours and dried at room temperature by placing on a filter paper for 30 minutes. The modified membranes were then used to fabricate MEAs using commercial platinum/ruthenium (Pt/Ru) on a carbon catalyst and a platinum/carbon (Pt/C) catalyst, for the anode and the cathode, respectively (purchased from Fuel Cell Earth). The MEAs were fabricated with the modified membranes and a control membrane (untreated) at 125° C., 350 psi pressure for 3 minutes. The MEA was then assembled in a fuel cell hardware (purchased from Fuel Cell Technologies) and the performance (voltage vs. current density curve) was tested using a fuel cell test stand, also purchased from Fuel Cell Technologies. Prior to performance evaluation, the MEAs were incubated with humidified hydrogen/air at 70° C. for 2 hours at 400 mA/cm², at each desired relative humidity (RH) value. The internal MEA resistance was measured using an Agilent 4300B milli-ohmeter. Hydrogen crossover was measured in the fuel cell with hydrogen/nitrogen at the anode/cathode by maintaining 0.4 V potential at the cathode, and measuring the current.

Figure 2:
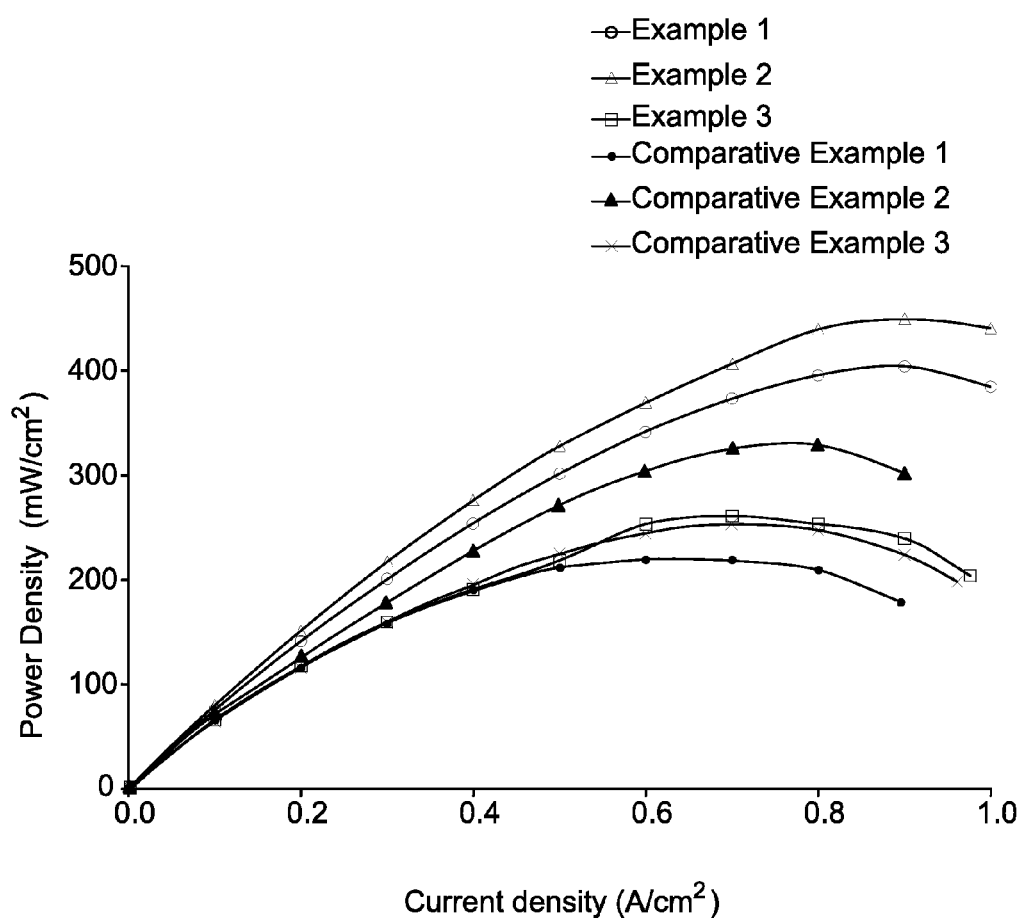
FIG. 2 illustrates the power density versus current density curves for fuel cells, according to some embodiments of the invention.
Figure 3:
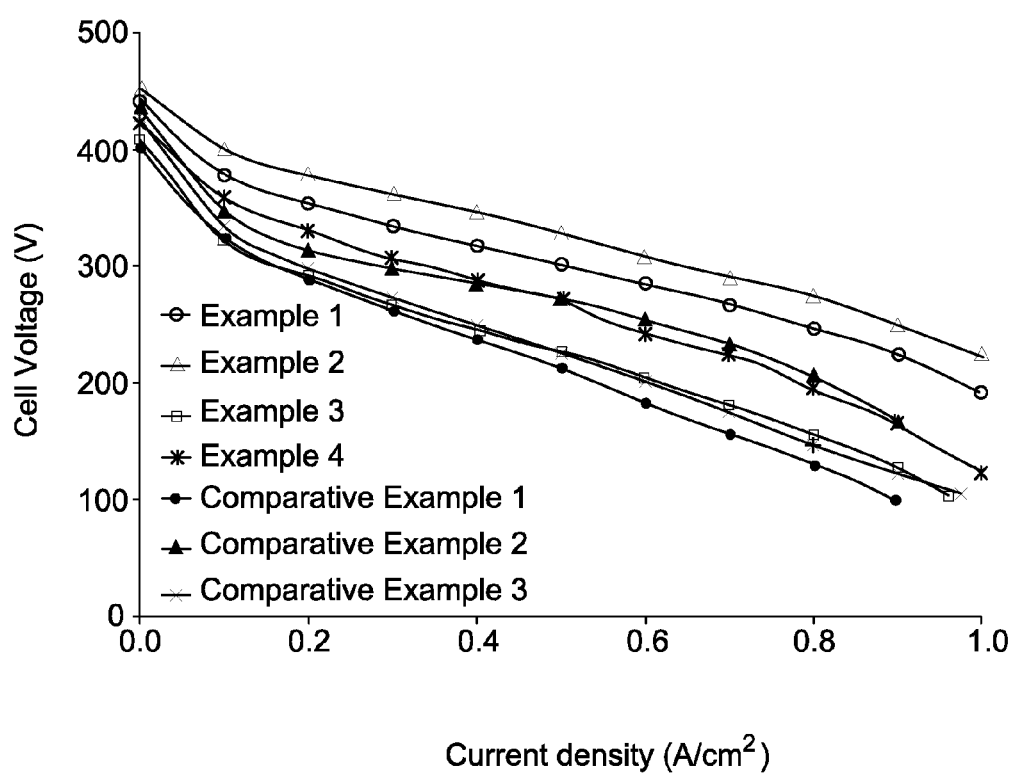
FIG. 3 illustrates the cell voltage versus current density curves for fuel cells, according to some embodiments of the invention.

Table 1 provides the list of additives evaluated along with their calculated Hansen solubility parameter, their molar volume, and molecular weight. FIGS. 2 and 3 show the power density vs. current density and voltage vs. current density curves for Examples 1-4 and Comparative Examples 1-3 at 60% RH. As illustrated in FIGS. 2 and 3, the power output of the fuel cells improved significantly for membranes treated with the additives (Examples 1-4), in comparison to the untreated membrane (Comparative Example 1). As further illustrated in FIGS. 2 and 3, the membranes treated with the linear additives (Comparative Example 2) and polar linear additives (Comparative Example 3) exhibited poorer performance attributes when compared to Examples 1-2.

Figure 4:
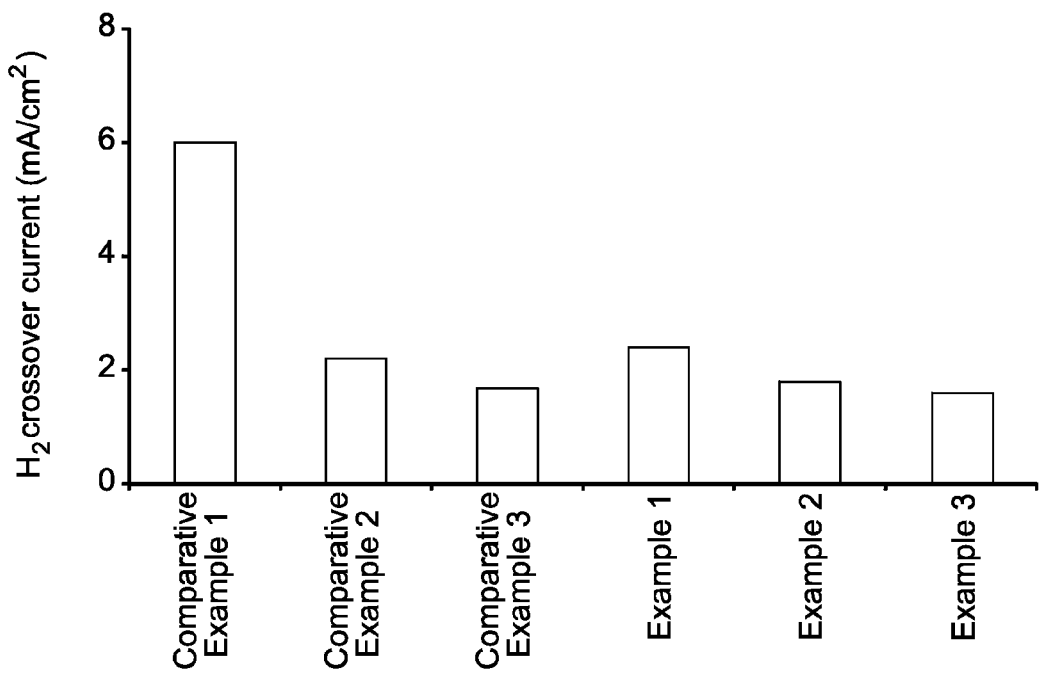
FIG. 4 illustrates the $H_2$-crossover data for fuel cells, according to some embodiments of the invention.

FIG. 4 further shows the $H_2$-crossover data for the various membranes. As indicated in FIG. 4, the membranes treated with the additives (Examples 1-3) showed reduced $H_2$ crossover when compared to the untreated membrane (Comparative Example 1). Accordingly, an unexpected significant increase in performance (power output) of the membranes treated with the additives was observed, especially at low relative humidity (60% RH), when compared to the untreated membrane. It should be noted that although Example 3 did not show significantly improved performance characteristics versus Comparative Example 1, the $H_2$-crossover value for Example 3 was significantly lower when compared to Comparative Example 1.

TABLE 1

Summary of organic liquid compounds as additives

| Example No. | Additive Type | Additive's Hansen Solubility Parameter ($MPa^{0.5}$) | | | | Molar Volume ($cm^3$/mol) | Molecular Weight (g/mol) |
| --- | --- | --- | --- | --- | --- | --- | --- |
| | | $d_D$ | $d_P$ | $d_H$ | $d_t$ | | |
| Comparative Example 1 | None | | | | | | |
| Comparative Example 2 | Perfluorononane | 12.2 | 0 | 0 | 11.9 | 272.3 | 452.1 |
| Comparative Example 3 | Perfluoroamylamine | 12.8 | 0 | 0.1 | 12.8 | 449.7 | 785.2 |
| Example 1 | Decalin | 17.3 | 0.7 | 1.2 | 17.3 | 159 | 138.2 |
| Example 2 | Pefluorodecalin | 12.6 | 0.8 | 0.4 | 11.9 | 275.4 | 477.1 |
| Example 3 | Perfluoroflourene | 11.7 | 0 | 0 | 11 | 306.9 | 571.1 |
| Example 4 | Perfluorobenzyldecalin | 12.3 | 0 | 0 | 11.5 | 411.6 | 774.2 |

It may be noted that perfluorononane (a fluorinated linear alkane) and perfluorodecalin (a fluorinated cycloalkane) have nearly equivalent solubility characteristics (as estimated by their total Hansen solubility parameters($\delta_t$)), and molecular size (as indicated their molar volume). However, when a Nafion® 212 fluoropolymer membrane is modified with the perfluorodecalin additive (Example 2), it unexpectedly exhibited a conductivity less sensitive to changes in the RH, relative to the perfluorononane additive-modified Naftion® 212 membrane (Comparative Example 2), as well as the untreated Nafion® 212 control membrane (Comparative Example 1). Other cycloaliphatic additives, such as decalin, also exhibited improved performance even though their solubility parameters and molecular volumes were significantly different than Comparative Examples 2 and 3. Thus, cycloaliphatic additives may provide an unexpected benefit when used as additives with acid-functional fluoropolymer-electrolyte membranes. Further, as indicated in FIGS. 2 and 3, within the cycloaliphatic additives, the fluorinated additive (Example 2) showed better performance properties than the non-fluorinated additive (Example 1). The $H_2$-crossover value was also lower for Example 2 versus Example 1.

The present invention has been described in terms of some specific embodiments. They are intended for illustration only, and should not be construed as being limiting in any way. Thus, it should be understood that modifications can be made thereto, which are within the scope of the invention and the appended claims. Furthermore, all of the patents, patent applications, articles, and texts which are mentioned above are incorporated herein by reference.

The invention claimed is:

1. A polymer-electrolyte membrane, comprising:
an acid-functional polymer; and
a fluorinated cycloaliphatic additive incorporated in at least a portion of the membrane, wherein the fluorinated cycloaliphatic additive has a boiling point greater than about 120° C., and wherein the fluorinated cycloaliphatic additive is present in the membrane in an amount in a range from about 0.5 weight percent to about 10 weight percent of the total weight of the membrane.

2. The polymer-electrolyte membrane of claim 1, wherein the acid-functional polymer comprises a plurality of acid functional groups selected from the group consisting of a sulfonic acid moiety, a phosphoric acid moiety, a phosphonic acid moiety, a sulfonylimide moiety, and combinations thereof.

3. The polymer-electrolyte membrane of claim 1, further comprising an electrolyte comprising water, an oxo-acid, a nitrogen heterocyclic base, or combinations thereof.

4. A membrane electrode assembly comprising the polymer-electrolyte membrane of claim 1.

5. The polymer-electrolyte membrane of claim 1, wherein the fluorinated cycloaliphatic additive comprises a fluorinated cycloaliphatic compound selected from the group consisting of cis-perfluorodecalin, trans-perfluorodecalin, perfluoro-1-methyldecalin, perfluoroisopentyl-tetrahydropyran, perfluorobicyclohexane, perfluorohydrophenanthrene, tetracosafluorotetradecahydroanthracene, perfluoro-1,4,5,8-dimethanodecalin, and combinations thereof.

6. The polymer-electrolyte membrane of claim 1, wherein the acid-functional polymer comprises an acid functional fluoropolymer.

7. An electrochemical fuel cell, comprising:
a first electrode;
a second electrode; and
a polymer-electrolyte membrane disposed between the first electrode and the second electrode, wherein the polymer-electrolyte membrane comprises:
an acid-functional polymer; and
a fluorinated cycloaliphatic additive incorporated in at least a portion of the membrane, wherein the fluorinated cycloaliphatic additive has a boiling point greater than about 120° C., and wherein the fluorinated cycloaliphatic additive is present in the membrane in an amount in a range from about 0.5 weight percent to about 10 weight percent of the total weight of the membrane.

8. The electrochemical fuel cell of claim 7, further comprising an electrolyte comprising water, an oxo-acid, a nitrogen heterocyclic base, or combinations thereof.

9. A method of making an electrochemical fuel cell, comprising:
(i) incorporating an additive into at least a portion of a polymer-electrolyte membrane to form an additive-modified polymer-electrolyte membrane,
wherein the additive comprises a fluorinated cycloaliphatic compound having a boiling point greater than about 120° C., wherein the fluorinated cycloaliphatic compound is present in the membrane in an amount in a range from about 0.5 weight percent to about 10 weight percent of the total weight of the membrane; and
(ii) assembling a first electrode, the additive-modified polymer-electrolyte membrane, and a second electrode into the electrochemical fuel cell.

10. The method of claim 9, wherein the step (i) comprises contacting at least a portion of the polymer-electrolyte membrane with a solution comprising the additive.

* * * * *